May 19, 1964  A. A. WHITE  3,133,455
REVERSIBLE POWER DRIVE AND STEERING STRUCTURE
Filed April 17, 1961  3 Sheets-Sheet 1

INVENTOR.
Allen Andrew White
BY
Hovey, Schmidt, Johnson & Hovey
ATTORNEYS.

INVENTOR.
Allen Andrew White

May 19, 1964 A. A. WHITE 3,133,455
REVERSIBLE POWER DRIVE AND STEERING STRUCTURE
Filed April 17, 1961 3 Sheets-Sheet 3
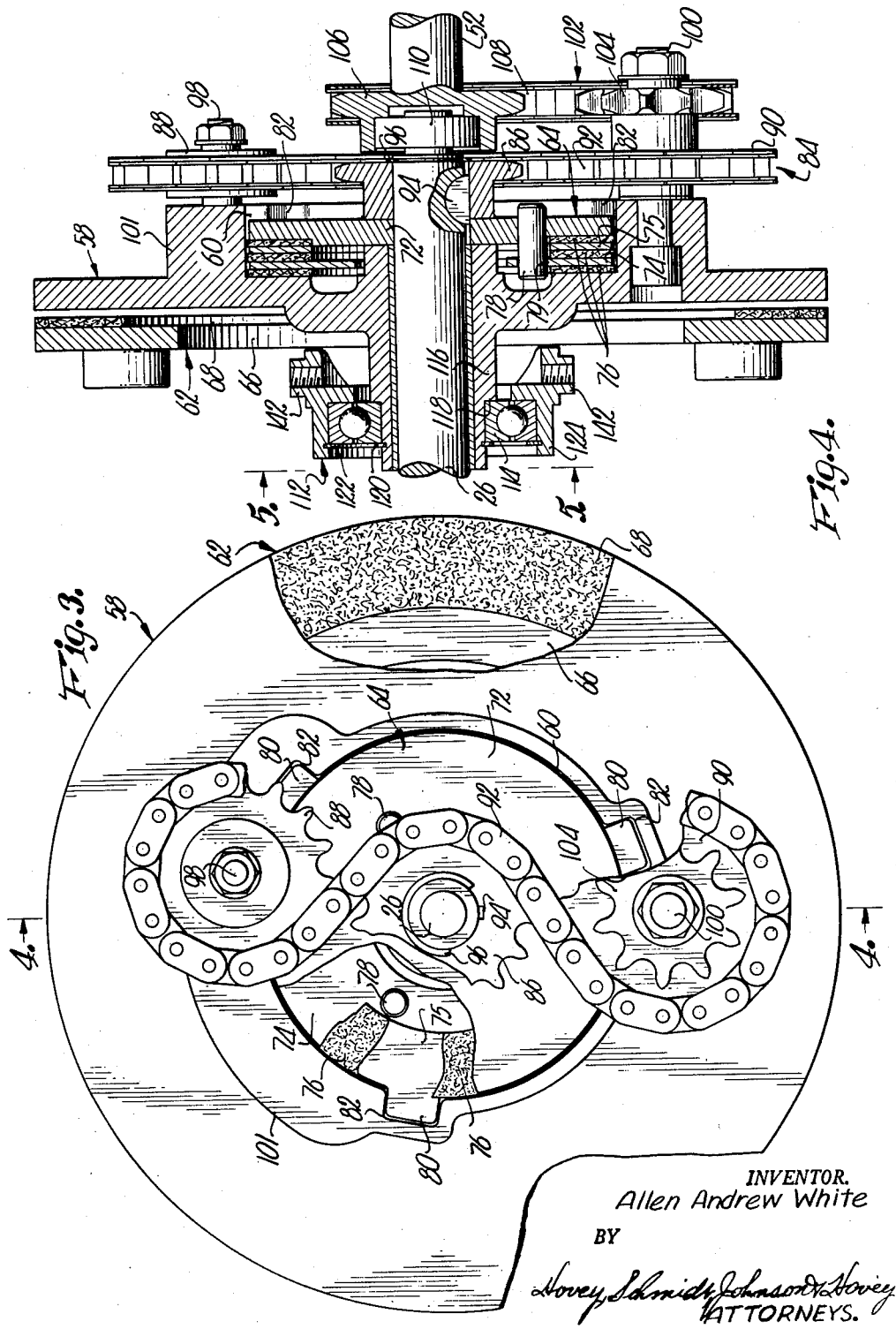
INVENTOR.
Allen Andrew White
BY
Hovey, Schmidt, Johnson & Hovey
ATTORNEYS.

United States Patent Office 3,133,455
Patented May 19, 1964

3,133,455
REVERSIBLE POWER DRIVE AND STEERING
STRUCTURE
Allen Andrew White, Peabody, Kans., assignor to Hesston
Manufacturing Co., Inc., Hesston, Kans., a corporation
of Kansas
Filed Apr. 17, 1961, Ser. No. 103,450
15 Claims. (Cl. 74—720.5)

This invention relates to the field of farm implements and more particularly, to a combination drive and steering assembly wherein fore and aft movement of a pair of ground wheels of a windrower or other mobile vehicle is under the direct control of the operator, not only with respect to the speed of rotation thereof, but more particularly, in regard to the direction of rotation together or relatively.

It is the primary object of the instant invention to provide a variable transmission between a prime mover and a pair of driven shafts and, therefore, a corresponding pair of wheels or other apparatus to be operated by the driven shafts that involves the use of but a single set of mechanics for each driven shaft respectively, permitting the operator to change from a forward direction of rotation of the driven shafts simultaneously or separately, thence to neutral and then to reverse as distinguished from the more complicated conventional type of clutch arrangement utilizing multiple mechanics to accomplish such purposes.

Still another important object of the present invention is to provide an assembly of the aforementioned character that permits fore and aft movement, as well as turning movements wherein the two ground wheels may be driven in opposite directions at the same time, all through action on the part of the operator which involves but slight movement of a pair of control arms or the like, thereby rendering the implement highly maneuverable and permitting rapid change in the direction of rotation of either or both ground wheels in an unusually easy, simple and expeditious manner.

A further object of the instant invention is the provision of a power transmission-steering assembly having a pair of units, each of which is in turn provided with parts that require little, if any complicated adjustments, or precision in manufacture for synchronization as distinguished from the aforementioned common clutch arrangements wherein proper and efficient operation is dependent to a large extent, upon synchronized settings.

A still further object of the present invention is to provide a relatively insensitive, safe and easily operated system of the kind above described which requires but little manpower on the part of the operator.

Another object of the instant invention is to incorporate within the transmission and steering controls, a clutch arrangement that eliminates the conventional spring-loaded principle wherein the operator must work against such heavy springs in order to shift through the forward neutral and reverse positions.

It is an important aim of this invention also to utilize a sun and planet drive in a unique manner as the means for transmitting or imparting motion to a driven shaft in either direction from a shiftable control member forming a part of the clutch unit and whose movement is relatively slight throughout the shifting from forward to neutral, and thence to reverse.

Still another aim of the present invention is to provide an operating mechanism between the shiftable control and the operator-actuated arms or the like, which is easily adjusted for accurate operation, and which provides the necessary safety, as will become clear during the course of the following specification.

In the drawings:

FIG. 3 is an enlarged, fragmentary, side elevational view, parts being broken away to reveal details of construction, showing one of the sun and planet structures, but eliminating the corresponding driven shaft and its chain and sprocket wheel unit;

FIG. 4 is a fragmentary, vertical, cross-sectional view taken on line 4—4 of FIG. 3, but showing the corresponding driven shaft and its chain and sprocket wheel unit and illustrated with the planet sprocket wheel thereof 180° displaced from FIG. 3;

Figure 6:
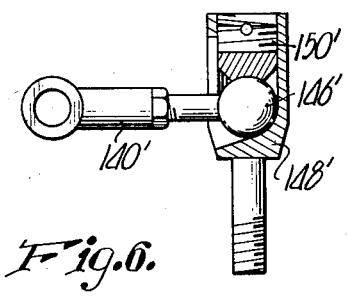
Figures 7, 8, 9:
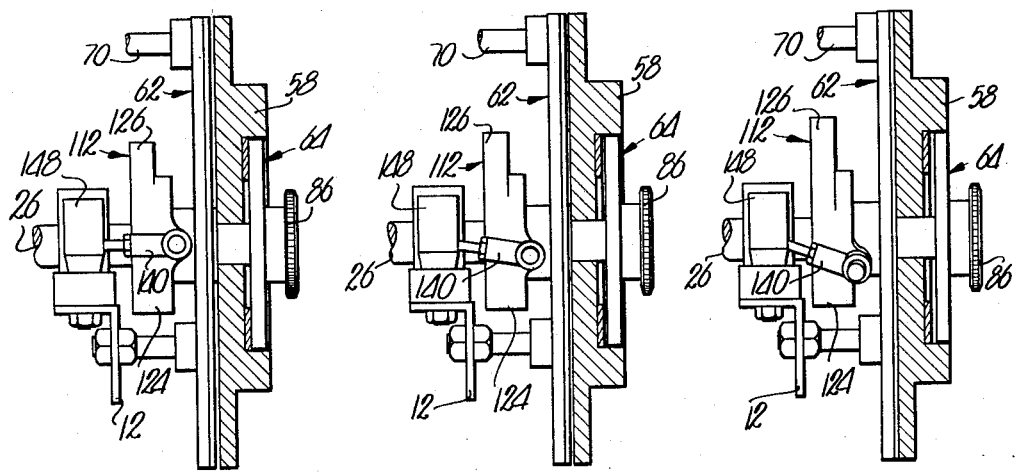

FIG. 6 is a detailed view still further enlarged partially in elevation and partially in section showing one of the extensible links and its universal joint mounting for the mechanism which couples the shiftable control of the clutch with the operator-actuated control arm; and FIGS. 7, 8 and 9 are fragmentary, partially schematic views in elevation and in section showing the three positions, forward, neutral and reverse respectively, of the shiftable control and the mechanism for shifting the same.

A rigid frame includes a pair of spaced, horizontal beams 10 and 12 that may be interconnected by cross braces 14 and 16 and provided with upstanding panels 18 and 20 that are in turn joined by a cross head 22.

The beams 10 and 12 support through suitable bearings as illustrated, a countershaft 24 and a jack shaft 26 in spaced parallelism, the countershaft being driven by the drive shaft of any suitable prime mover (not shown) through belt and pulley means 28. The jack shaft 26 is in turn driven by the countershaft 24 through belt and pulley means 30 which includes variable speed pulleys 32 and 34 on shafts 24 and 26 respectively. Sections 32a and 34a of pulleys 32 and 34 respectively, are shiftable along their corresponding shafts 24 and 26, sections 32b and 34b being rigid to their shafts. Section 34a is yieldably biased toward the section 34b by a spring 36 coiled on shaft 26, and section 32a is shifted toward and away from section 32b by operator control of a lever 38.

Figure 1:
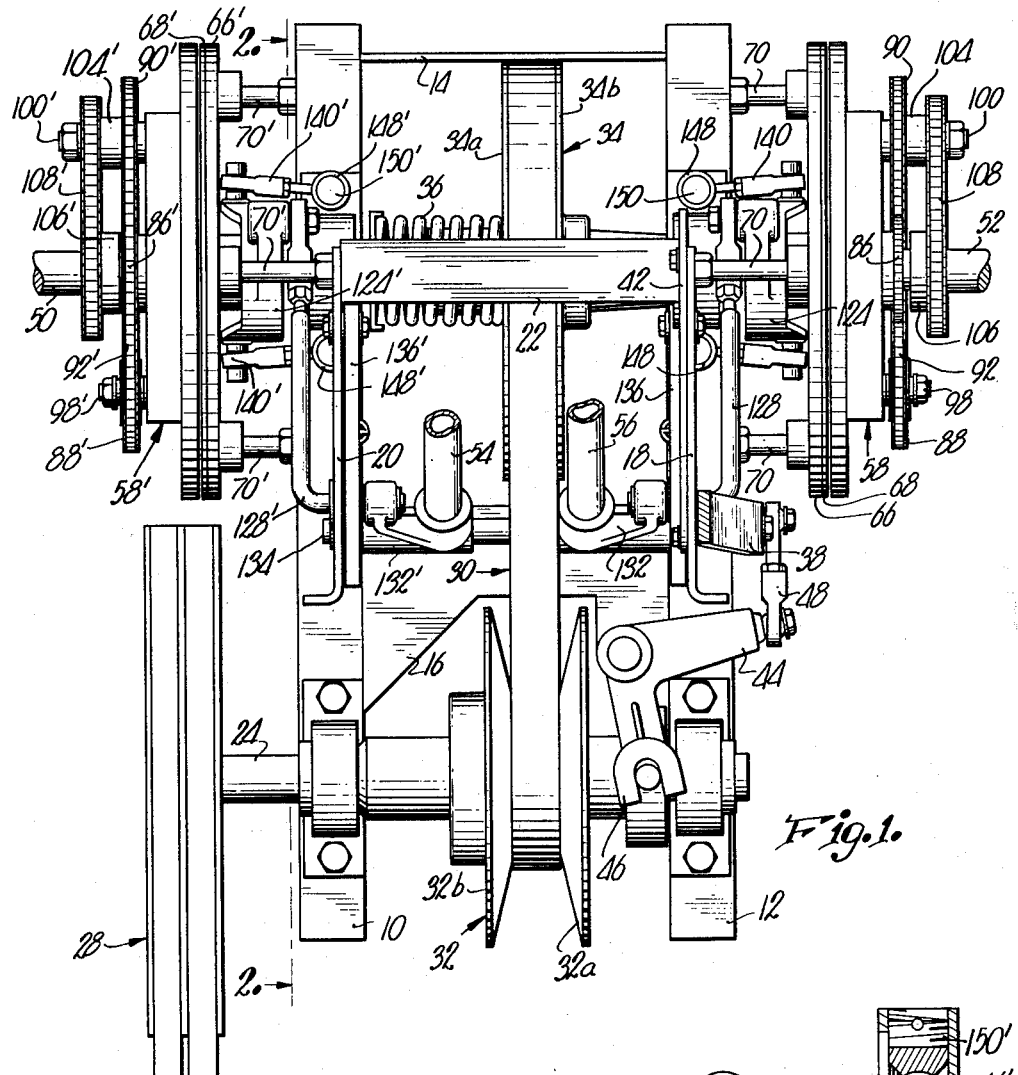
FIGURE 1 is a plan view of a reversible power drive and steering structure made pursuant to my present invention and adapted for coupling with a pair of implement ground wheels or other apparatus to be driven thereby.
Figure 2:
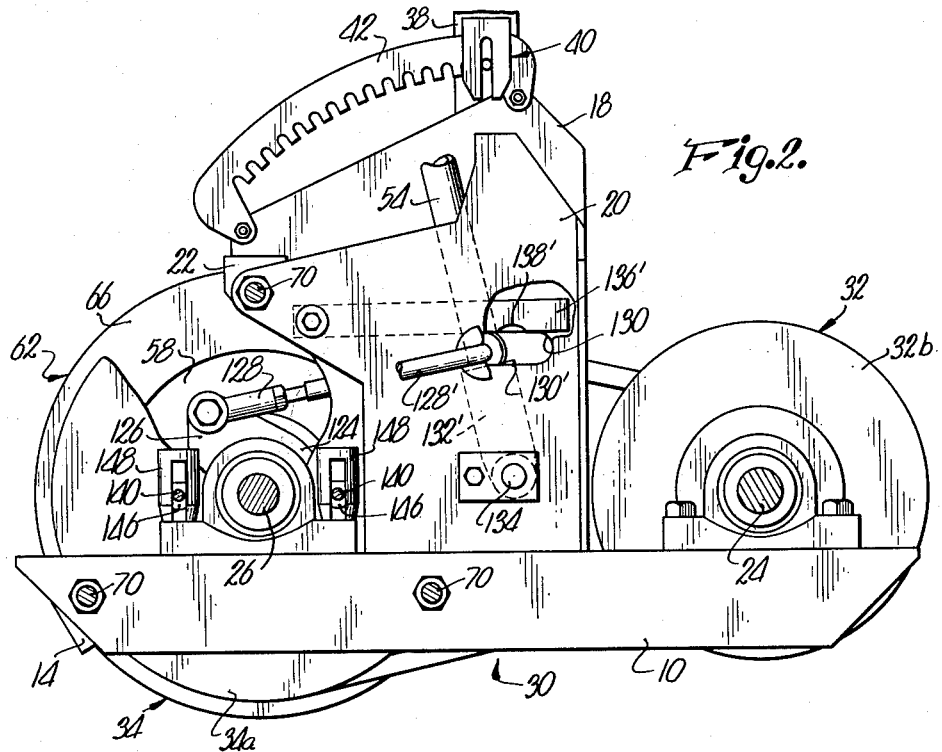
FIG. 2 is a vertical, cross-sectional view taken on line 2—2 of FIG. 1, parts being broken away for clearness.

Lever 38, swingable fore and aft on the panel 18, may be held in selected positions through the medium of a manually releasable conventional type of latch 40 cooperating with an arcuate rack 42 that is in turn secured to the panel 18 as best seen in FIGS. 1 and 2. Lever 38 is operably coupled with the shiftable pulley section 32a through a bell crank 44 having a fork 46 coupled with pulley section 32a, together with an adjustable link 48 that is pivotally joined with lever 38 and connected with crank 44 by a universal joint as seen in FIG. 1. Manifestly, spring 36 yields to permit pulley section 34a to move away from pulley section 34b whenever lever 38 is caused to swing in a direction which shifts pulley section 32a toward pulley section 32b.

In accordance with the principles of the instant invention, the jack shaft 26 which rotates constantly in one direction, may be caused to rotate a pair of driven shafts 50 and 52 either in a forward or reverse direction, or be caused to rotate idly, depending upon the position of corresponding operator control arms 54 and 56. Inasmuch as the transmission-steering assembly for shaft 50 and arm 54 is the same as that provided for shaft 52 and arm 56, the latter will be described, and in the drawings, the corresponding identical parts for the shaft 50 will be designated by the same numerals all suitably primed.

Referring first to FIGS. 3 and 4, a control member broadly designated by the numeral 58, is carried by shaft 26 for rotation thereon, as well as reciprocation longitudinally thereof, the member 58 being, in part at least, in the nature of a housing by virtue of the fact that it is provided with a recess 60 in its outermost face.

The rotatable, shiftable control member or housing 58 is disposed for movement between a pair of spaced friction units broadly designated by the numerals 62 and 64, the unit 62 including a fixture in the nature of an annulus 66 that is suitably faced with a friction band 68 made from leather, rubber or some sufficiently elastic, frictionable material which does not polish too readily and thus induce slipping. Annulus 66 concentric with shaft 26 therearound, is supported by panel 18 and beam 12 through the medium of a plurality of adjustable bolts 70.

The friction unit 64 includes an abutment or clutch plate 72 that surrounds the shaft 26 for rotation therewith within the recess 60. Additionally, there is provided in the recess 60, between the plate 72 and the bottom of recess 60, a pair of clutch discs 74 and 75, and a number of friction rings 76 alternating therewith. By providing the pair of clutch discs 74 and 75 and the number of friction rings 76, the contact is made more intimate as the surface engaged is increased, and the elastic, frictionable material of the respective faces of the friction rings 76 caused to bind.

The disc 74 is caused to rotate with the plate 72 by virtue of the provision of a plurality of pins 78 carried by the plate 72 and extending loosely through holes 79 in the disc 74. The disc 75, on the other hand, is caused to rotate with the member 58 by virtue of coacting projections 80 on the disc 75, and interdental spaces 82 in the member 58 as seen in FIG. 3.

Sun and planet structure broadly designated by the numeral 84, includes a sun sprocket wheel 86, a pair of planet sprocket wheels 88 and 90, and a continuous chain 92 operably coupling the wheels 88 and 90 with the wheel 86.

The wheel 86 is mounted for rotation with the shaft 26 by provision of a key 94 and imparts rotation to the plate 72 by being welded thereto. A split washer 96 engaged with the shaft 26, prevents movement of the wheel 86 along the shaft 26 outwardly of the latter.

The wheels 88 and 90 are rotatably mounted on the control 58 by the use of stub axles 98 and 100 respectively, parallel with the shaft 26, the axles 98 and 100 manifestly revolving about the shaft 26 as an axis during rotation of the control 58 as illustrated in FIG 3.

The chain 92 has one stretch thereof offset inwardly between the wheels 88 and 90 so that it meshes with the wheel 86 in a manner to cause rotation of the driven shaft 86 in a manner to cause rotation of the driven shaft 52 in either direction as will hereinafter appear. A counterbalance weight 101 forming an integral part of control member 58, accommodates for the shift of the center of gravity caused by the arrangement of chain 92.

A chain and sprocket wheel unit 102 operably interconnecting control 58 and driven shaft 52, includes a sprocket wheel 104 rigid to sprocket wheel 90, a sprocket wheel 106 rigid to driven shaft 52, and a continuous chain 108 interconnecting the wheels 104 and 106.

The shaft 52 is disposed in end-to-end axial alignment with the shaft 26 and is supported at one end thereof by a bearing 110 on shaft 26 that is housed within the hub of sprocket wheel 106 in supporting relationship to the latter. Shaft 52 is, of course, provided with additional bearing supports (not shown) having means for holding it against outward axial movement away from the proximal reduced end of shaft 26 upon which the bearing 110 is mounted.

Mechanism operably coupling manual control arm 56 with the control 58 to shift the latter between the two units 62 and 64, is broadly designated by the numeral 112. In includes a bearing 114 on tubular hub portion 116 of member 58 held between a shoulder 118 on hub 116, and split washers 120 and 122, the latter of which is carried by a rotatable element of collar 124 therewithin.

Figure 5:
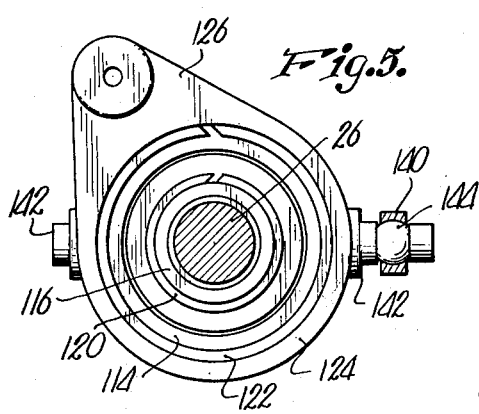
FIG. 5 is a fragmentary, cross-sectional view taken substantially on line 5—5 of FIG. 4.

Collar 124 houses, and therefore, surrounds the bearing 114 and is caused to rotate, or more appropriately, oscillate, when the arm 56 is swung. To this end, element 124 has a web 126 extending radially outwardly therefrom as seen best in FIGS. 2 and 5, pivotally receiving one end of an extensible, L-shaped rod 128. Rod 128 extends through a slot 130 in panel 18 (see FIG. 2) and pivotally connects with a head 132 to which arm 56 is connected, the head 132 oscillating about a pin 134 that interconnects the panels 18 and 20. Panel 18 also carries a swingable bar 136 provided with a notch (not shown) which engages the rod 128 when the arm 56 is intermediate the ends of its path of travel, i.e., in neutral. The corresponding notch in bar 136' is shown in FIG. 2 of the drawings and designated by the numeral 138'.

The oscillatory collar element 124 is coupled with the beam 12 by a pair of extensible links 140, one in front of, and the other rearwardly of the shaft 26. Diametrically opposed bosses 142 are formed on the element 124, each of which supports a ball 144, providing a universal connection with the corresponding link 140. The links 140 are also universally coupled with the beam 12 (see FIG. 6) by a ball 146 on each link 140 within an internally threaded socket device 148, the latter of which is bolted to the beam 12 and provided with a nut 150 for retention of the ball 146.

During operation, shaft 26 rotates anticlockwise viewing FIG. 2, and its speed of rotation may be controlled not only through adjustment of lever 38 as above described, but through variance in the speed of the drive shaft of the prime mover for belt and pulley means 28 as is quite common.

When the arms 54 and 56 are swung forwardly in the position illustrated in FIGS. 1 and 2, the shaft 26 is coupled with the shafts 50 and 52 to drive the latter in the same direction as shaft 26.

When the arms 54 are retracted rearwardly to a position intermediate their paths of swinging movement, the bars 136 and 136', by their inherent weight, swing downwardly so that the rods 128 and 128' engage in the notches (see notch 138') of bars 136 and 136', thereby yieldably holding the arms 54 and 56 in the neutral position. By neutral, it is meant that shaft 26 continues to rotate idly, but no motion is imparted to the driven shafts 50 and 52.

When the arms 54 and 56 are pulled rearwardly, i.e., swung to the right viewing FIG. 2, thereby lifting the bars 136 and 136', the shaft 26 is operably coupled with the shafts 50 and 52 to drive the latter in a direction opposite to the direction of rotation of the shaft 26.

Hence, it can be seen that when the beams 10 and 12 are mounted on, or incorporated in a farm implement, such as a windrower, the shafts 50 and 52 may be coupled with a pair of corresponding ground-engaging wheels (not shown) in any suitable and conventional manner. When such is done, the vehicle will travel forwardly when the arms 54 and 56 are in the position illustrated in FIGS. 1 and 2, will remain stationary when the arms 54 and 56 are substantially vertical, and will travel in reverse when the arms 54 and 56 are in a position inclined upwardly and rearwardly from the pin 134.

It is to be appreciated however, that since the arms 54 and 56 may be swung independently of each other, one ground wheel may be caused to rotate forwardly, while the other is caused to operate in reverse. Such condition arises when arm 54 for example, is swung forwardly as in FIGS. 1 and 2, and arm 56 retracted rearwardly. Or, it is possible for the operator to cause one wheel to travel forwardly or rearwardly, while the other ground wheel remains stationary. This condition arises when, for example, arm 54 is as shown in FIGS. 1 and 2, and arm 56 is vertically disposed or in its neutral position.

The obvious advantage of such arrangement is in making of right-angle turns. If such a turn is desired, one ground wheel may be caused to rotate forwardly by shifting one of the arms 54—56 forwardly, and shifting the other arm 54—56 rearwardly, the two ground wheels rotating oppositely and both at the speed of rotation of the shaft 26, provided of course, that a direct connection is made between the shafts 50 and 52 and the ground wheels without use of speed change mechanism.

The way in which all of the above is accomplished is best understood by considering FIGS. 7, 8 and 9 of the drawings in connection with FIGS. 1 to 6 inclusive. When the arm 54 is swung forwardly as in FIGS. 1 and 2, the control member 58 shifts toward the plate 72, clamping the discs 74 and the rings 76 tightly between the plate 72 and the bottom of recess 60. This shifting of the control 58 occurs by virtue of the forward movement of the rod 128 which causes slight forward rotation of the element 124 counterclockwise viewing FIG. 2. Such movement on the part of element 124 swings the links 140 to substantially the position shown in FIG. 7, thereby causing element 124 to move toward the shaft 52 as it rotates. Element 124 thereby shifts the control 58 in the same direction along shaft 26 through bearing 114. It is to be preferred that links 140 swing slightly past center, so that the arms 54 and 56 will remain in the forward position, and the forward drive of the shafts 52 will continue until released, thereby eliminating the need for the operator to hold the arms 54 and 56 in the forward positions.

When the control 58 is thus connected with plate 72 by frictional adherence among the various interengaging surfaces of control 58, discs 74, rings 76 and plate 72, all of such parts are caused to rotate as a unit with the sun sprocket wheel 86 and the shaft 26. As a consequence, the stub axles 98 and 100 revolve about the shaft 26 because of their connection with the control member 58 for rotation therewith. The planet wheels 88 and 90 do not rotate about their axles 98 and 100 and, of course, there is no rotation of sprocket wheel 104, nor does the chain 92 move with respect to the wheels 86, 88 and 90. However, by virtue of the revolving of the wheel 104 around the shaft 52 without rotation of wheel 104 on its own axle 100, the wheel 106 and, therefore, its shaft 52 are caused to be driven by the chain 108 in the same direction of rotation of shaft 26.

When the arm 54 is retracted rearwardly, i.e., swung to the right viewing FIG. 2, to the substantially vertical position, a pull is exerted on web 126 through rod 128, thereby rotating the element 124 slightly in a clockwise direction viewing FIG. 2. This again swings the links 140 from the substantially horizontal position shown in FIG. 7 to an inclined position as illustrated in FIG. 8, thereby pulling the element 124 toward the stationary beam 12. This releases control 58 from its frictional connection with plate 72, permitting shaft 26 to rotate freely without driving the shaft 52. When control 58 is free from both units 62 and 64, sun wheel 86, acting on chain 92 and, therefore, wheel 104, causes rotation of the control 58 without imparting movement to the shaft 52. Manifestly, the resistance of shaft 52 to rotation being greater than the resistance of control 58 to rotate about shaft 26, chain 108 merely travels around the wheel 106 without actuating the latter as the wheel 104 revolves around the shaft 52. In the neutral position shown in FIG. 8, one of the links 140 extends downwardly from its corresponding socket device 148 as illustrated in FIG. 8, whereas the opposed link 140, not seen in FIG. 8, extends upwardly at an angle from its socket device 148.

When the arm 54 is pulled to the rearmost end of its path of travel, element 124 is rotated still farther in a clockwise direction viewing FIG. 2, increasing the angularity of the links 140 as shown in FIG. 9, thereby pulling the element 124 still farther toward the beam 12 and shifting the control 58 into engagement with the band 68. This operates to hold the control 58 against rotation and incidentally, for safety reasons, the operator must maintain a pull on the arms 54 and 56 whenever reverse movement of the ground wheels is to take place.

With control 58 so held against rotation, shaft 26 drives sun wheel 86, and wheel 86 in turn rotates wheels 88 and 90 on their axles 98 and 100 through chain 92. With wheel 104 rotating on axle 100, but not revolving around the shaft 52, wheel 106, and therefore shaft 52, are driven by chain 108 in a direction opposite to the direction of rotation of shaft 26.

When arms 54 and 56 are released, the reverse drive is broken and they are releasably held in the neutral position by operation of bars 136 and 136'.

It now becomes apparent, that since the entire movement of the control 58 is slight, an operator is able to maneuver the implement with ease and quite quickly since not much movement on the part of the arms 54 and 56 is required to shift throughout the entire cycle from forward to reverse, and again back through neutral to a forward condition. Furthermore, as initially hereinabove set forth, very little effort is required on the part of the operator since he need merely shift the controls 58 along the shaft 26 against very little, if any resistance to such movement. There is no need for the use of springs or other structure to hold the control 58 at one end of its path of travel as heretofore provided in conventional clutches and, therefore, such heavy resistance does not need to be overcome by the operator. It is quite advantageous in a transmission-steering assembly of this nature, to always move to neutral when shifting from either forward or reverse conditions.

Finally, the merits of the mechanism 112 are not to be overlooked. The push-pull action imparted on the control 58 by the links 140, is positive, and accurate adjustments can be made in the effective lengths of links 140 to predetermine the pressure exerted on the two units 62 and 64 as the arms 54 and 56 are moved to the ends of their paths of swinging movement. As can now be appreciated, a slight oscillatory movement is needed in the elements 124 in order to effect the full travel of control 58 between units 62 and 64.

Having thus described the invention, what is claimed as new and desired to be secured by Letters Patent is:

1. In combination, a pair of shafts; a rotatable control; means for connecting the control with one of the shafts for rotation therewith; means for holding the control against rotation; sun and planet structure including a sun sprocket wheel secured to the one shaft for rotation therewith, a number of planet sprocket wheels rotatable on the control about axes parallel with the axis of the sun wheel and adapted to rotate with the control around the sun wheel along a path concentric therewith, and a continuous chain connecting the sun wheel with the planet wheels for rotation of the latter oppositely to the sun wheel; and means coupling one of the planet wheels with the other shaft, whereby when the control is connected with the one shaft the planet wheels are held against rotation about their axes and the shafts rotate together in the same direction, and when the control is held against rotation, the planet wheels and the other shaft rotate oppositely to the one shaft and the sun wheel, and when the control is permitted to rotate freely with respect to the one shaft, the connection between the shafts is broken.

2. In combination, a pair of shafts; a rotatable control shiftable along one of the shafts; means connecting the control with said one shaft for rotation therewith when the control is shifted in one direction; means holding the control against rotation when the control is shifted in the opposite direction; sun and planet structure including a sun sprocket wheel secured to the one shaft for rotation therewith, a number of planet sprocket wheels rotatable on the control about axes parallel with the axis of the sun wheel and adapted to rotate with the control around the sun wheel along a path concentric therewith, and a continuous chain connecting the sun wheel with the planet wheels for rotation of the latter oppositely to the sun wheel; and means coupling one of the planet wheels with the other shaft, whereby when the control is connected with the one shaft the planet wheels are held against rotation about their axes and the shafts rotate together in the same direction, and when the control is held against rotation, the planet wheels and the other shaft rotate oppositely to the one shaft and the sun wheel, and when the control is permitted to rotate freely with respect to the one shaft, the connection between the shafts is broken.

3. In combination, a jack shaft and a driven shaft disposed in end-to-end, axially aligned relationship; a rotatable control shiftable along the jack shaft; an abutment secured for rotation with the jack shaft and disposed for engagement by the control when the latter is shifted in one direction whereby the control becomes connected with the jack shaft for rotation therewith by frictional adherence between the control and the abutment; means holding the control against rotation when the control is shifted in the opposite direction; sun and planet structure including a sun sprocket wheel secured to the jack shaft for rotation therewith, a number of planet sprocket wheels rotatable on the control about axes parallel with the axes of the sun wheel and the shafts, and adapted to rotate with the control around the sun wheel along a path concentric with the latter and with the jack shaft, and a continuous chain connecting the sun wheel with the planet wheels for rotation of the latter oppositely to the sun wheel; and means coupling one of the planet wheels with the driven shaft, whereby when the control is connected with the jack shaft the planet wheels are held against rotation about their axes and the driven shaft is driven by the jack shaft in the same direction therewith, and when the control is held against rotation, the planet wheels and the driven shaft are driven by the jack shaft in a direction opposite to that of the jack shaft, and when the control is permitted to rotate freely with respect to the jack shaft, the driving connection between the shafts is broken.

4. In combination, a jack shaft and a driven shaft disposed in end-to-end, axially aligned relationship; a rotatable control shiftable along the jack shaft; means connecting the control with the jack shaft for rotation therewith when the control is shifted in one direction; a fixture disposed for engagement by the control when the latter is shifted in the opposite direction whereby the control is held against rotation by frictional adherence between the control and the fixture; sun and planet structure including a sun sprocket wheel secured to the jack shaft for rotation therewith, a number of planet sprocket wheels rotatable on the control about axes parallel with the axes of the sun wheel and the shafts, and adapted to rotate with the control around the sun wheel along a path concentric with the latter and with the jack shaft, and a continuous chain connecting the sun wheel with the planet wheels for rotation of the latter oppositely to the sun wheel; and a chain and sprocket wheel unit coupling one of the planet wheels with the driven shaft, whereby when the control is connected with the jack shaft the planet wheels are held against rotation about their axes and the driven shaft is driven by the jack shaft in the same direction therewith, and when the control is held against rotation, the planet wheels and the driven shaft are driven by the jack shaft in a direction opposite to that of the jack shaft, and when the control is permitted to rotate freely with respect to the jack shaft, the driving connection between the shafts is broken.

5. In combination, a jack shaft and a driven shaft disposed in end-to-end, axially aligned relationship; a rotatable control shiftable along the jack shaft; an abutment secured for rotation with the pack shaft and disposed for engagement by the control when the latter is shifted in one direction whereby the control becomes connected with the jack shaft for rotation therewith by frictional adherence between the control and the abutment; a fixture disposed for engagement by the control when the latter is shifted in the opposite direction whereby the control is held against rotation by frictional adherence between the control and the fixture; sun and planet structure including a sun sprocket wheel secured to the jack shaft for rotation therewith, a number of planet sprocket wheels rotatable on the control about axes parallel with the axes of the sun wheel and the shafts, and adapted to rotate with the control around the sun wheel along a path concentric with the latter and with the jack shaft, and a continuous chain connecting the sun wheel with the planet wheels for rotation of the latter oppositely to the sun wheel; and a chain and sprocket wheel unit coupling one of the planet wheels with the driven shaft, whereby when the control is connected with the jack shaft the planet wheels are held against rotation about their axes and the driven shaft is driven by the jack shaft in the same direction therewith, and when the control is held against rotation, the planet wheels and the driven shaft are driven by the jack shaft in a direction opposite to that of the jack shaft, and when the control is permitted to rotate freely with respect to the jack shaft, the driving connection between the shafts is broken.

6. In combination, a jack shaft and a driven shaft disposed in end-to-end, axially aligned relationship; a clutch plate secured for rotation with the jack shaft; a fixed friction band spaced from the abutment; a housing between the plate and the band, rotatable on the jack shaft, and shiftable along the jack shaft; a plurality of clutch discs and friction rings, alternately arranged and surrounding the jack shaft within the housing between the latter and the plate; mechanism coupled with the housing for shifting the latter alternately into engagement with the band and into position clamping the discs and rings between the housing and the plate, whereby when the housing is in said position it becomes connected with the jack shaft for rotation therewith by frictional adherence among the discs, the rings, the housing and the plate, and when the housing is in engagement with the band it is held against rotation by frictional adherence between the housing and the band; sun and planet structure including a sun sprocket wheel secured to the jack shaft for rotation therewith, a number of planet sprocket wheels rotatable on the housing about axes parallel with the axes of the sun wheel and the shafts, and adapted to rotate with the housing around the sun wheel along a path concentric with the latter and with the jack shaft, and a continuous chain connecting the sun wheel with the planet wheels for rotation of the latter oppositely to the sun wheel; and a chain and sprocket wheel unit coupling one of the planet wheels with the driven shaft, whereby when the housing is connected with the jack shaft the planet wheels are held against rotation about their axes and the driven shaft is driven by the jack shaft in the same direction therewith, and when the housing is held against rotation, the planet wheels and the driven shaft are driven by the jack shaft in a direction opposite to that of the jack shaft, and when the housing is permitted to rotate freely with respect to the jack shaft, the driving connection between the shafts is broken.

7. In combination, a rigid frame; a shaft, a member shiftable along the shaft; and mechanism for shifting the member including an element, structure interconnecting said element with the member for movement therewith along the shaft and rotatable with respect thereto, and means coupled with the element for rotating the latter, said means including a plurality of links, each pivotally secured at one end thereof to the element for swinging movement about an axis normal to the shaft, and each normally disposed in substantially parallel relationship to the shaft when the member is shifted to one end of its path of travel, and means pivotally attaching the links at their opposite ends to said frame whereby, upon rotation of the element, the member will be shifted to the opposite end of its path of travel.

8. In combination, a rigid frame; a shaft; a member rotatable on and shiftable along the shaft; and mechanism for shifting the member including an element surrounding the member; a bearing having relatively shiftable inner and outer races, one of said races being secured to said member and the other race being secured to said element, said bearing being disposed for interconnecting the member and the element for movement of the latter with the member and rotation with respect thereto, and means coupled with the element for rotating the latter, said means including a plurality of extensible links, each pivotally secured at one end thereof to the element for swinging movement about an axis normal to the shaft, and each normally disposed in substantially parallel relationship to the shaft when the member is shifted to one end of its path of travel, and universal joints pivotally attaching the links at their opposite ends to said frame whereby, upon rotation of the element, the member will be shifted to the opposite end of its path of travel.

9. In combination, a pair of shafts; a rigid frame; a rotatable control shiftable along one of the shafts; means connecting the control with said one shaft for rotation therewith when the control is shifted in one direction; structure coupling the control with the other shaft when the control is connected with the one shaft, for rotation of the shafts and the control together in one direction as a unit; means holding the control against rotation when the control is shifted in the opposite direction, said structure having means coupling the shafts for rotation in opposite directions when the control is held against rotation; and mechanism for shifting the control including an element carried by the control for movement therewith along the one shaft and rotatable with respect thereto, means coupled with the element for rotating the latter, a plurality of links, each pivotally secured at one end thereof to the element for swinging movement about an axis normal to the one shaft, and each normally disposed in substantially parallel relationship to the one shaft when the control is shifted in said one direction, and means pivotally attaching the links at their opposite ends to said frame whereby, upon rotation of the element, the control will be shifted in said opposite direction.

10. In combination, a jack shaft; a pair of driven shafts; a rotatable control member for each driven shaft respectively; means for each member respectively for connecting the same with the jack shaft for rotation therewith; structure for each member respectively for coupling the same with its corresponding driven shaft when it is connected with the jack shaft, for rotation of the shafts and the members together in one direction as a unit; and means for each member respectively for holding the same against rotation, each structure having means for coupling its driven shaft with the jack shaft for rotation in a direction opposite to the jack shaft when the corresponding member is held against rotation, each member having mechanism coupled therewith for shifting the same whereby the rotation of the driven shafts may be separately controlled in either direction.

11. In combination, a pair of spaced driven shafts; a jack shaft disposed between the driven shafts in end-to-end, axially aligned relationship thereto, each driven shaft having a rotatable control shiftable along the jack shaft, each control being provided with an abutment disposed for engagement thereby when the same is shifted in one direction, the abutments being secured to the jack shaft whereby the controls become connected with the jack shaft for rotation therewith when the controls are frictionally bound against their abutments, each control being provided with a fixture disposed for engagement thereby when the same is shifted in the opposite direction whereby the controls are held against rotation when the same are frictionally bound against their fixtures; an operable connection with the jack shaft between each control and its corresponding driven shaft comprising sun and planet structure including a sun sprocket wheel secured to the jack shaft for rotation therewith, a number of planet sprocket wheels rotatable on the control about axes parallel with the axes of the sun wheel and the shafts, and adapted to rotate with the control around the sun wheel along a path concentric with the latter and with he jack shaft, a continuous chain connecting the sun wheel with the planet wheels for rotation of the latter oppositely to the sun wheel, and a chain and sprocket wheel unit coupling one of the planet wheels with the driven shaft, whereby when the control is connected with the jack shaft, the planet wheels are held against rotation about their axes and the driven shaft is driven by the jack shaft in the same direction therewith, and when the control is held against rotation, the planet wheels and the driven shaft are driven by the jack shaft in a direction opposite to that of the jack shaft, and when the control is permitted to rotate freely with respect to the jack shaft, the driving connection between the shafts is broken; and mechanism for each control respectively and coupled therewith for shifting the same whereby the rotation of the driven shafts may be separately controlled in either direction.

12. In combination with a clutch having a shiftable member, mechanism for shifting the member including a rotatable element, structure interconnecting said element with the member, and means coupled with the element for rotating the latter, said means including a plurality of links, each pivotally secured at one end thereof to the element, and means pivotally anchoring the links at their opposite ends whereby upon rotation of said element the latter is moved toward and away from the anchoring means to thereby shift the member therewith.

13. The invention of claim 12, wherein said means for rotating the element includes parts for releasably locking the element at one end of its path of travel.

14. The invention of claim 13, wherein is provided an over-center movement of said links upon rotation of the element in one direction to effect said locking.

15. The invention of claim 14, wherein one of the pivotal connections of each link comprises a ball and socket joint whereby to eliminate lost motion and slack during rotation of the element to shift the member.

References Cited in the file of this patent

UNITED STATES PATENTS

| 2,210,598 | Pepper et al. | Aug. 6, 1940 |
| 2,328,133 | Foster | Aug. 31, 1943 |
| 2,463,265 | Graves | Mar. 1, 1949 |
| 2,799,175 | Peck | July 16, 1957 |
| 2,930,246 | Johnson et al. | Mar. 29, 1960 |
| 2,936,578 | Chamberlain | May 17, 1960 |